United States Patent [19]

Haubner et al.

[11] 4,327,687

[45] May 4, 1982

[54] TIMING SYSTEM FOR PROCESS CONTROL IN INTERNAL COMBUSTION ENGINES

[75] Inventors: Georg Haubner, Berg; Werner Meier, Rednitzhembach; Jürgen Wesemeyer, Nuremberg; Hans Schrumpf, Oberasbach, all of Fed. Rep. of Germany

[73] Assignee: Robert Bosch GmbH, Stuttgart, Fed. Rep. of Germany

[21] Appl. No.: 154,286

[22] Filed: May 29, 1980

[30] Foreign Application Priority Data

Jun. 9, 1979 [DE] Fed. Rep. of Germany ....... 2923425

[51] Int. Cl.³ .......................... F02P 3/00; G06F 1/02; F02P 5/04

[52] U.S. Cl. .................................... 123/416; 123/414; 123/609; 315/209 T

[58] Field of Search ............... 123/414, 617, 416, 417, 123/445, 480, 484, 146.5 A, 602, 594, 609, 618, 612, 643; 315/209 T

[56] References Cited

U.S. PATENT DOCUMENTS

| | | | |
|---|---|---|---|
| 3,418,989 | 12/1968 | Silverman | 123/643 |
| 4,009,378 | 2/1977 | Sakomoto | 123/416 |
| 4,138,976 | 2/1979 | Crall | 123/414 |
| 4,167,928 | 9/1979 | Pagel | 123/643 |
| 4,181,884 | 1/1980 | Shirasaki et al. | 123/414 |
| 4,207,846 | 6/1980 | Boret et al. | 123/416 |
| 4,217,868 | 8/1980 | Grather et al. | 123/416 |
| 4,248,195 | 2/1981 | Gorille | 123/609 |
| 4,250,846 | 2/1981 | Menard | 123/643 |

FOREIGN PATENT DOCUMENTS

| | | | |
|---|---|---|---|
| 1253517 | 11/1967 | Fed. Rep. of Germany | 123/612 |
| 2323661 | 1/1975 | Fed. Rep. of Germany | 123/416 |

*Primary Examiner*—Raymond A. Nelli

*Attorney, Agent, or Firm*—Frishauf, Holtz, Goodman & Woodward

[57] ABSTRACT

A disk mounted on a rotating shaft of an internal combustion engine has a signal generating segment which causes generation of a pickup signal having a leading and a trailing edge. The two different edges control different processes, as for example ignition processes of different ignition coils, fuel injection processes, or ignition processes during normal and starting operation. A basic counting value is counted down between two sequential edge signals in a counter. This is a speed-dependent value from which different countdown values for the next cycle are computed. To allow adjustment of the angle at which one process takes place without simultaneous adjustment of the angle at which the other process takes place, one or both of the edges of the segment from which the control signals are derived have slanted portions, so that movement of the pickup relative to the slanted portions will effectively cause a change in the angle at which a process is initiated.

14 Claims, 6 Drawing Figures

TIMING SYSTEM FOR PROCESS CONTROL IN INTERNAL COMBUSTION ENGINES

Cross reference to related applications and publications:

DE-OS No. 2 655 948;
DE-OS No. 2 736 576;
DE-PS No. 2 504 843;
DE-AS No. 2 539 113;
DE-OS No. 2 851 336.

The present invention relates to systems for timing processes in internal combustion engines. Such processes include, for example, the ignition process and the fuel injection process. In particular, it relates to internal combustion engines wherein a disk is carried by a rotating shaft and the disk has a signal-producing segment which, when passing in operative vicinity of pickup apparatus causes a pickup signal to be furnished by the pickup apparatus.

BACKGROUND AND PRIOR ART

A system of the above-described type is disclosed in DE-OS No. 2 655 948 in which, however, the pickup signals are used only to furnish a counting value which varies as a function of engine speed and to generate a reference mark for initiating ignition.

In the system disclosed in DE-OS No. 2 736 576, two ignition coils are provided for a mechanically immovable high voltage distributor. The current through the ignition coils is controlled by magnets of different polarization. However, the pickup apparatus for this type of signal generator is very complicated, since the signals produced for different engine speeds have very different signal shapes.

THE INVENTION

It is an object of the present invention to provide a timing system in an internal combustion engine which requires only an inexpensive signal generator for producing signals which are very exactly positioned at predetermined reference angles relative to a reference position of the shaft. Further, it is an object of the present invention to furnish a system wherein the pickup apparatus generates a pickup signal whose critical portions do not have any substantial changes in shape as a function of engine speed.

In accordance with the present invention, a disk having a signal producing segment rotates with a shaft of the engine. Pickup apparatus is provided which furnishes a pickup signal while the segment passes in operative vicinity thereof. Circuit means are provided which furnish a first and second input signal in response to the leading and trailing edge of the pickup signal. A computer computes a basic counting value durig the time interval between a selected first and second input signal. The so-computed basic counting value is held until receipt of the next subsequent input signal. The first and second process control signals are then applied to the first and second process control means at times in the cycle computed from the basic counting value and following receipt of the first and second input signal, respectively.

In order to allow an independent adjustment of the start and end of the pickup signal, i.e. of the generation of the first and second input signal, in a preferred embodiment one of the segment sides is slanted, and the pickup apparatus is movable relative to the slanted side, so that the rotational angle at which the slanted side passes the pickup apparatus can be changed without a change of the corresponding time of the other edge.

DRAWING DESCRIBING PREFERRED EMBODIMENTS

Figure 1:
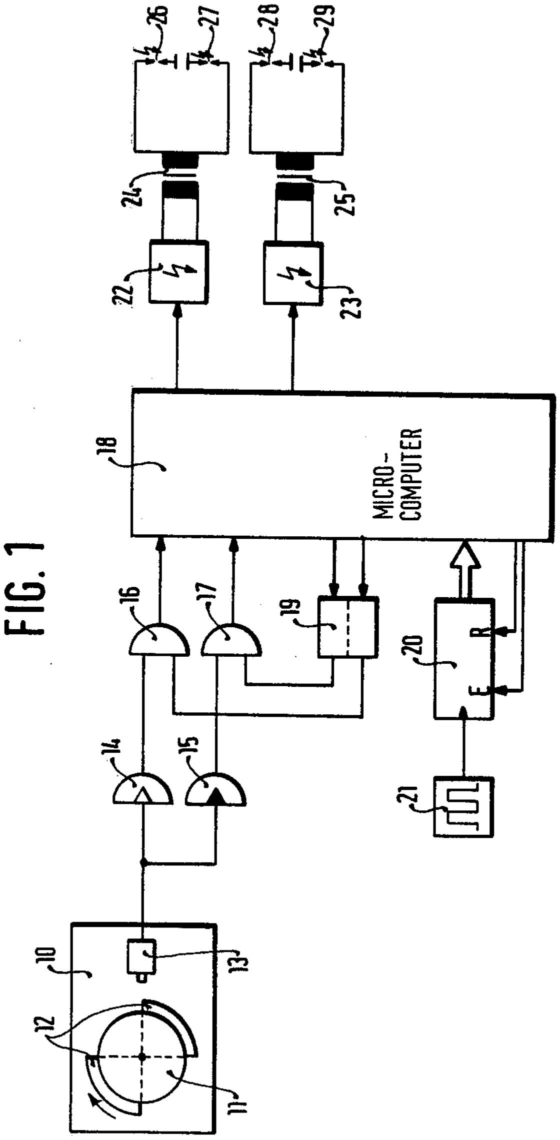
FIG. 1 is a circuit diagram, partially in block form, of a preferred embodiment of the present invention.

In the circuit diagram of FIG. 1, reference numeral 10 denotes a signal generator which includes a rotating disk 11 which has two 90° segments 12. The disk is mounted on the camshaft of an internal combustion engine and, for the illustrated case, controls the operation of a four-cylinder internal combustion engine. If the disk were mounted on the crankshaft, a 180° segment would be required. For different numbers of cylinders or for nonsymmetrical arrangements of cylinders, the number and the angle covered by the segments will differ. So, for example, a single segment is required for a two-cylinder V-90 internal combustion engine, the segment covering an angle of 225° (or its complement of 135°). The edges of segments 12 are sensed by pickup apparatus 13 which can, for example, be a magnetic barrier such as a Hall generator or a light barrier. In any case, the pickup apparatus 13 generates a signal when the segment passes therethrough. Thus, complementary signals are generated at the end and at the beginning of each segment. It must be understood that instead of the external segments illustrated, the disk could have cutout portions.

The output of pickup apparatus 13 is applied to the input of two dynamic stages 14, 15, i.e. stages which are responsive to a signal change 0/1 and a signal change 1/0, respectively. The output of stages 14 and 15 is applied to one input of AND gates 16 and 17, respectively. The outputs of AND gates 16 and 17 are both connected to inputs of a microcomputer 18. The microcomputer is used to compute the ignition timing in dependence of selected parameters of the internal combustion engine. In the simplified illustration, the microcomputer receives only the outputs of AND gates 16 and 17 and computes therefrom a basic counting value which varies as a function of engine speed. Methods for computing ignition and other timing in an internal combustion engine by means of computers and on the basis of sensed parameters in the internal combustion engine are disclosed in DE-PS No. 2 504 843, DE-AS No. 2 539 113 and DE-OS No. 2 851 336. Two outputs of the microcomputer are connected to the set and reset inputs of a flip-flop 19, whose complementary outputs are connected to the second inputs of AND gates 16 and 17, respectively. Outputs of microcomputer 18 control the blocking input E as well as the reset inpt R of a counter 20 which is used to compute the basic counting value which varies as a function of speed. The counting outputs of counter 20 apply to inputs of microcomputer 18.

The counting input of counter 20 is connected to a clock frequencey generator 21. Two control outputs or microcomputer 18 apply the process control signals to process control means 22, 23. In the illustration of FIG. 1, the process control means are known output stages of ignition circuits which initiate and interrupt the current through ignition coils 24, 25 respectively. The secondary windings of ignition coils 24 and 25 are respectively connected to spark plugs 26, 27, and 28, 29.

OPERATION

Figure 2:
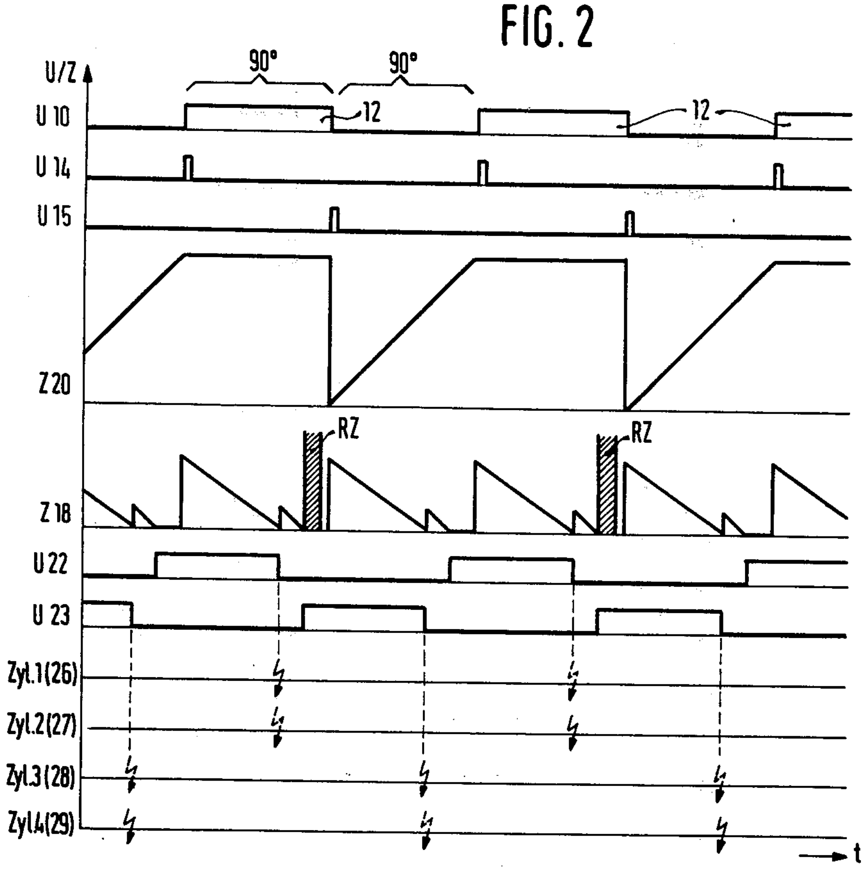
FIG. 2 is a signal-versus-time diagram for illustrating the operation of the system for a four-cylinder internal combustion engine.

The operation of the system shown in FIG. 1 will now be explained with reference to FIG. 2. Stages 14 and 15 are known stages which react, respectively, to the leading and trailing edge of the pickup signal furnished by pickup apparatus 13. The signal sequences U14 and U15 result at the outputs of stages 14 and 15, respectively. AND gates 16 and 17 are connected to complementary outputs of flip-flop 19. Only one of these AND gates is therefore conductive at any one time. The conductive one of the AND gates generates an output signal when a signal is received from the one of stages 14 and 15 connected to its other input. This output signal is applied to microcomputer 18. In response to this signal, microcomputer 18 flips flip-flop 19 to its other stable state and, simultaneously, enables the output to stage 22 in response to receipt of the signal from AND gate 16 and that to stage 23 in response to the signal from AND gate 17. Finally, each signal U14 is applied to the blocking input E of counter 20, while each signal U15 is applied to its reset input. The counter is thus blocked between receipt of a signal U14 and the next subsequent signal U15. The same action could, of course, be achieved by connection to the corresponding output of flip-flop 19. Starting at receipt of a signal U15 and until receipt of the next following signal U14, counter 20 counts the signals from clock generator 21. Since these are applied at a steady rate, the count on counter 20 upon receipt of signal U14 is a basic counting value which varies as a function of engine speed. Specifically, the higher the engine speed, the lower the counting value and vice versa. Thereafter, the counter is blocked for the time interval between receipt of signal U14 and the next following signal U15. The so-computed basic counting value therefore is held. From this counting value, and possibly taking into account the values of other parameters of the internal combustion engine, two countdown values Z18 are computed. These are counted down sequentially in a counter internal to microcomputer 18, always starting with one of the signals U14 or U15. The countdown takes place from the countdown value to a predetermined value, such as, for example, zero. As illustrated in FIG. 2, when the first countdown reaches the predetermined value following a signal U14, the current in ignition coil 24 is interrupted. The end of the second countdown following receipt of a signal U14 causes the current to be initiated in coil 25. Similarly, the end of the first countdown following receipt of a signal U15 interrupts the current in coil 25 and the end of the second countdown initiates current flow in coil 24. A complete cycle of the internal combustion engine thus includes four countdowns. Following such four countdowns, a computing cycle is initiated which computes the countdown values for the next cycle from the basic counting value Z20. The computing cycle RZ is shown as a shaded region in FIG. 2.

The two sequential countdowns can, of course, equally well be accomplished by a single countdown which has two thresholds. The principle of generating counting values as a function of engine parameters, counting down such counting values and the subsequent initiation of an ignition and/or fuel injection process is described in the above-identified publications and will not be described in greater detail here.

As illustrated in FIG. 2, a spark is generated at spark plugs 26 and 27 or spark plugs 28 and 29 simultaneously upon interruption of current at the corresponding ignition coil. Spark plugs 26, 27, 28 and 29 are associated with cylinders 1, 3, 2, 4, respectively. The simultaneously generated sparks therefore encounter an ignitable mixture in one cylinder but a non-ignitable mixture in the other. This is indicated in FIG. 2 by use of a solid line for indicating an actual ignition process and a dashed line for indicating a spark which does not cause an ignition because the mixture is not suitable for ignition. The effective sparks therefore generate a spark sequence of 1-2-3-4.

Figure 3:
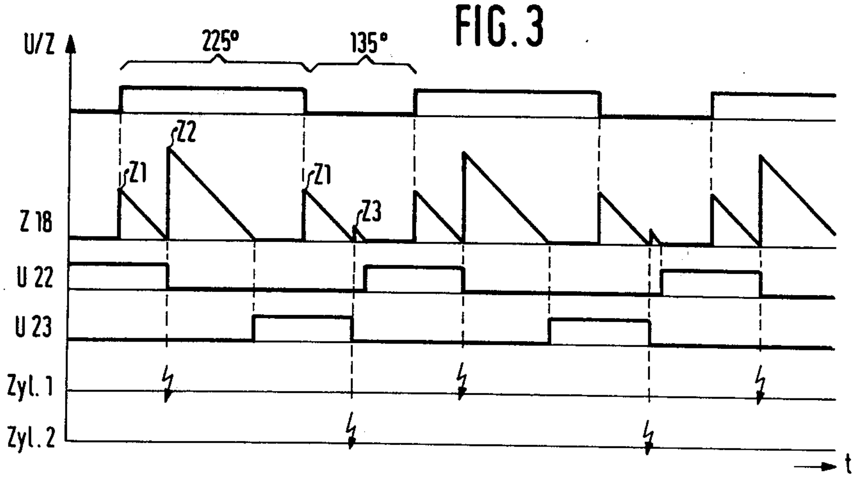
FIG. 3 is a signal-versus-time diagram for illustrating the operation of the system for a two-cylinder V-90 internal combustion engine.

In FIG. 3 the conditions for a two-cylinder V-90 internal combustion engine are pictured. Ignition must take place in the tempo of 225°, 135°, 225°, 135°, etc. From the basic counting value generated either during the segment angle of 225° or during the space of 135°, three different countdown values Z1, Z2, Z3 must be derived which are counted down in pairs Z1, Z2, Z1 Z3 following the leading and trailing edges of the segment, respectively. The ends of the countdown processes determine the termination of current flow in one ignition coil and the start of a current flow in the other, respectively. Of course, for this embodiment, only one spark plug is connected to each ignition coil. If, in a simplified version, the requirement for a constant time of current flow prior to ignition is dispensed with, then only one countdown value need be computed. The computing cycle for computing the required counting values for the next cycle follows at the end of each cycle of the internal combustion engine or, alternatively, may take place following receipt of each of the input signals. It will be noted that in this way it is possible to control even unsymmetrical ignition processes with use of only a single pickup 13 and a very simple segmental disk.

Figure 4:
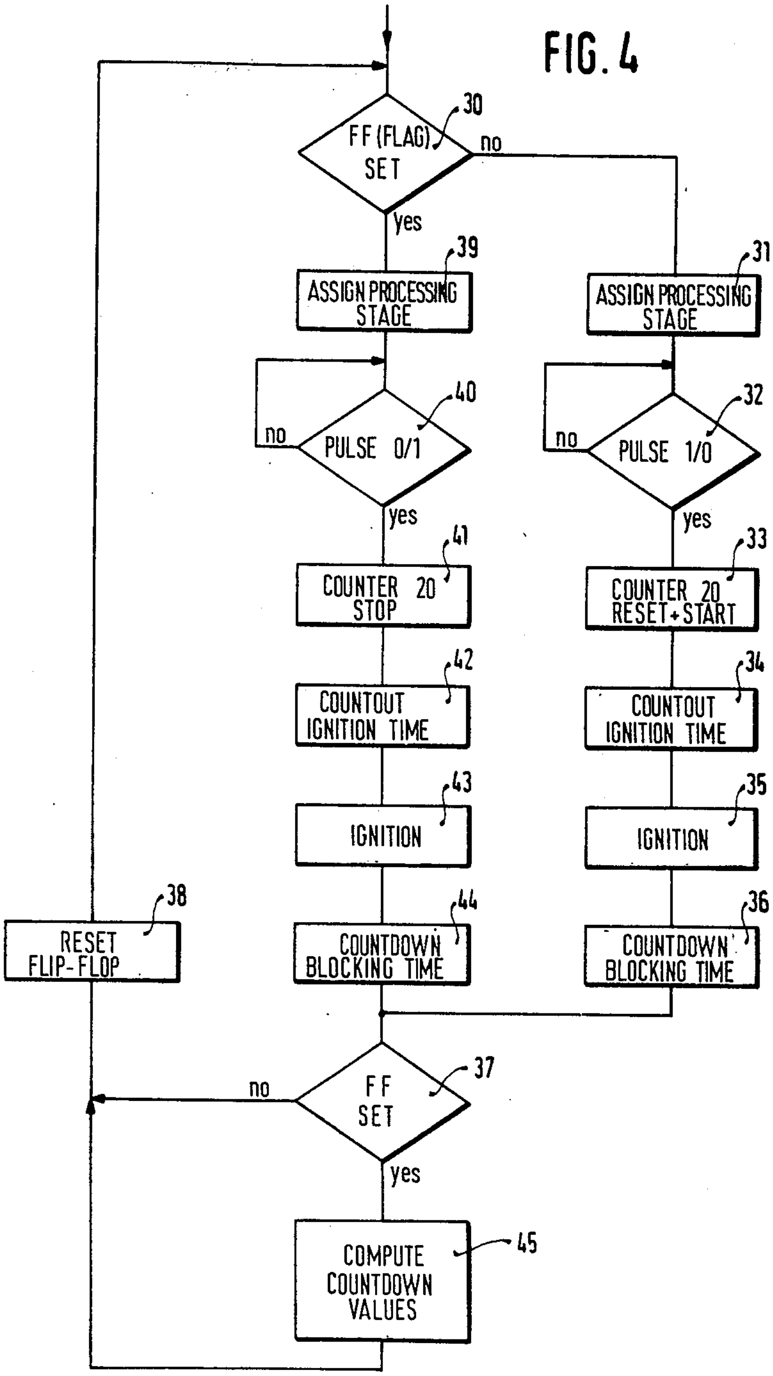
FIG. 4 is a flow chart for the microcomputer controlling the processes.

The flow chart shown in FIG. 4 illustrates the operation of microcomputer 18. In this flow chart, the microcomputer also takes over the functions of elements 16, 17, 19 and 20 of FIG. 1. In the first program step 30, flip-flop 19 (or flag) is interrogated. At first, the flip-flop will not be set. Therefore in a program step 31, the process control stage (e.g. 22) associated with the reset state of the flip-flop will be connected to microprocessor 18. The arrival of signal U15 (1/0) edge of the pickup signal is then awaited. When this arrives, counter 20 is reset and starts counting. The countdown for the ignition timing is started simultaneously in program step 34. At its end, the process control signal is applied to the ignition stage, i.e. a spark is initiated (program step 35). The countdown of the second counting value, i.e. the time until initiation of current, is then counted out in program step 36. In program step 37, interrogation of flip-flop 19 again takes place. Since this flip-flop is not as yet set, the program continues with step 38 in which the flip-flop is flipped, i.e. in this case is set. The program then continues with program step 30 and, since the flip-flop is not set, continues with step 39. Process control stage 23 is connected to microcomputer 18. The program then continues as in the first branch with the exception that counter 20 is blocked in program step 41 rather than reset. The engine speed dependent basic counting value therefore remains stored in the counter. Following program step 44, flip-flop 19 is again interrogated in program step 37. Since it is now set, a program step 45 is initiated in which the countdown values for the ignition time and for the start of current flow are computed for the next cycle in dependence upon the basic counting values stored in counter 20. These values are then available for program steps 34, 36, 42 and 44 of the next cycle. Thereafter flip-flop 19 is again flipped, causing the program to pass through steps 31 through 36.

It should be noted that a special starting program must be provided for furnishing counting values for program steps 34, 36, 42 and 44 at the start of operation, since these values have not yet then been computed in program step 45. Actually special conditions exist during starting in any case which are generally taken into consideration by a special start program. It should also be noted that after the countdown in stages 44 and 36 and after the resetting of the flip-flop and connection of the next process control stage to the microcomputer, the current in the ignition coil of the newly-connected process control stage must be initiated. Program steps may also be included which allow initiation of a spark only between the two associated edges.

The microcomputer operating under control of a disk having the above-described segments is not limited to controlling spark initiation by different ignition coils. The system described above relates to the initiation of ignition processes for different cylinders (FIG. 3) or for different cylinder groups (FIG. 2). Other applications for ignition processes are the control of the beginning and the end of current flow through at least one ignition coil by the leading and trailing edge of the segment. For this purpose, segments 12 must have such a shape that one edge occurs approximately 200° of crankshaft revolution prior to top dead center while the second edge occurs, for example, 40° of crankshaft rotation prior to top dead center position. It is also possible to have one edge at, for example, 40° before the top dead center position for control of ignition during normal operation, while a second edge, for example 10° prior to the top dead center position, controls the ignition timing during startup, since during startup a smaller preignition time is required. In the simplest case, the edge at 10° prior to dead center can be used directly to control the ignition timing. Alternatively, the edge can be used to start a countdown, so that the ignition angle can be varied during startup between 0° and 10°.

It is also possible to use one edge of the segment for controlling the fuel injection processes, while the other is used for controlling of ignition processes. The edges can, for this case, be arranged 60 and 40 degrees prior to the top dead center position. Finally, a mixed utilization of the pulses generated by the edges of the segment is possible. For example, for a four-cylinder internal combustion engine, one edge can be used as the reference point for ignition in the first and third cylinder as well as for the fuel injection timing of the second and fourth cylinders. Correspondingly, the second edge can constitute the reference point for ignition in the second and fourth cylinders as well as for the injection process in the first and third cylinders.

It should further be noted that instead of stages 14 and 15 a rectifier circuit, and more particularly a bridge rectifier circuit can be provided at both of whose outputs positive signals are generated by the segmental edges. The filtering of the pickup signal can be accomplished by a series RZ circuit.

Figure 5:
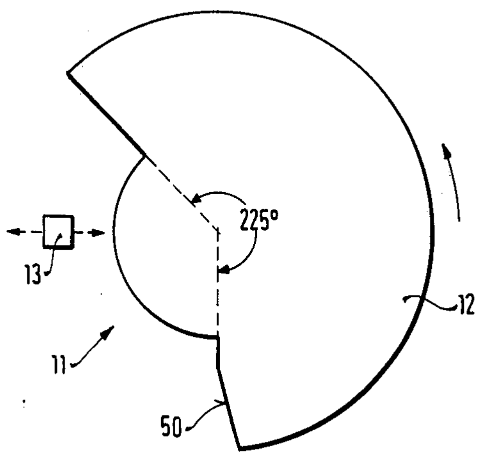
FIG. 5 is a first embodiment of a disk with a signal-producing segment.

Since the segment controls two different processes, adjustment of the timing of one process by rotation of the support on which pickup 13 is mounted will automatically cause a change in the timing of the other process. This is often undesirable and a separate adjustment of the timing of the signals from the two segments is very desirable. A disk 11 is shown in FIG. 5 which has a segment 12 which extends over a 225° arc. Such a disk is, for example, useful in controlling the type of ignition illustrated in FIG. 3. Segment 12 has a slanted portion 50. If pickup 13 is moved back and forth in the direction indicated by the arrow, the effective part of edge 50 will pass at an earlier or a later angle. This shift has the same effect as if the segment were decreased from one covering an angle of 225° to one covering an angle of, for example, 210°. Thus, corresponding to the slant of the segment edge, the angle between the two different edges of the segment can be varied over a predetermined angular region. The two processes to be controlled by the two edges can be separately adjusted within this angular region.

Figure 6:
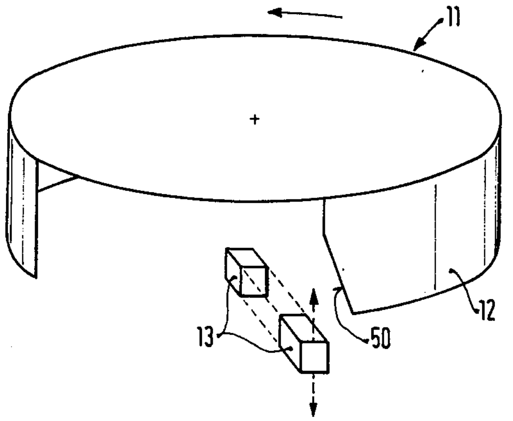
FIG. 6 is a second embodiment of a disk with signal-producing segment.

In FIG. 6, an embodiment of the disk with signal generating segment is illustrated in which segment 12 extends in a circumferential direction around the disk, but in a direction perpendicular thereto. One edge again has a slanted portion 50. Such a slanted portion can, of course, be part of both edges.

If pickup 13 which is here illustrated as a barrier through which the segment will pass is moved in a direction perpendicular to disk 11, the effective angle of the segment can again be changed. Since disk 11 must be mounted on an axle, this change in the position of pickup 13 can easily be accomplished by washers or gaskets. Alternatively, pickup 13 may be positioned by adjustment screws.

Various changes and modifications may be made within the scope of the inventive concepts.

We claim:

1. In an internal combustion engine having a rotating shaft, a disk rotating with said shaft and having at least one signal producing segment (12), and a sensor (13) for generating a pickup signal when said segment passes in the operative vicinity thereof, said pickup signal having a signal start (0/1) and a signal end (1/0), and at least first and second control circuits (22,23) for initiating, respectively, a first and second electric spark discharge in response, respectively, to first and second ignition coil control signals applied thereto: a system for furnishing said first and second ignition coil control signals in response, respectively, to said signal start and signal end comprising means (14,15) for furnishing a first and second trigger signal in response, respectively, to said pickup signal start and said pickup signal end, respectively;

computing means (18,20), connected to said trigger signal furnishing means, for computing, by counting at a predetermined rate, a basic value varying as a function of engine speed and determined by the interval between predetermined pairs of successive trigger signals, for holding said basic counting value at least until receipt of the next subsequent one of said trigger signals and for furnishing said first and second ignition coil control signals at times computed from said basic counting value following receipt of said first and second trigger signal, respectively, and repeating the furnishing of said ignition coil control signals as subsequent trigger signals are received.

2. A system as set forth in claim 1, in which said first and second ignition coil control signals control both the turning on and the switching off of current in respective ignition coils in said first and second control circuits, said system further comprising bistable circuit means (19) connected to said computing means for switching said computing means to control said first and second control circuits alternately in response to said first and second trigger signals.

3. A system as set forth in claim 1, wherein said computing means comprises means for computing a first and second countdown value from said basic counting value, means for counting down in sequence from said first and second countdown values to a first and second predetermined value, respectively, and means for furnishing said first and second ignition coil control signals upon reaching said first and second predetermined values, respectively.

4. A system as set forth in claim 1, wherein said first and second control circuits respectively comprise means for controlling the ignition of a first and second cylinder.

5. A system as set forth in claim 1, wherein said first and second control circuits respectively comprise means for controlling ignition in a first and second cylinder group.

6. A system as set forth in claim 1, wherein said first control circuit comprises means for controlling the ignition in a first cylinder and fuel injection processes of a second cylinder, and said second control circuit comprises means for controlling the ignition in a second cylinder and fuel injection processes of a first cylinder.

7. A system as set forth in claim 1, wherein said first control circuit comprises means for controlling ignition in a first cylinder group and fuel injection in a second cylinder group, and said second control comprises means for controlling ignition in said second cylinder group and fuel injection in said first cylinder group.

8. A system as set forth in claim 3, wherein a selected one of said first and second countdown values is equal to said predetermined value, whereby the corresponding one of said first and second ignition coil control signals is furnished directly in response to the corresponding one of said first and second trigger signals.

9. In an internal combustion engine having a shaft, a disk rotating with said shaft and having at least one signal producing segment, and a sensor (13) for generating a pickup signal when said segment passes in the operative vicinity thereof, and first and second control circuits respectively operative in response to first and second control signals, respectively, applied thereto for respectively controlling first and second events in said internal combustion engine, a system for furnishing said first and second control signals in response to said pickup signal, comprising first circuit means (14,15) for furnishing first and second trigger signals respectively in response to the leading and trailing edges of said pickup signal;

second circuit means (16,17,19) for applying said first and second trigger signals respectively to said first and second control circuits, directly or indirectly, and computing means interposed between said second circuit means and at least one of said control circuits for indirect activation of at least one of said control circuits in response to the trigger signal therefor and including a first counter operating at a predetermined counting rate for computing a basic counting value varying as a function of engine speed and determined by the interval between predetermined pairs of successive trigger signals and for holding said basic counting value until receipt of the next following trigger signal, and a second counter operating at said predetermined counting rate for computing delay in forwarding a trigger signal to at least one of said control circuits.

10. A system as set forth in claim 9, control circuit controls engine ignition during normal operation of said engine and said second control circuit controls engine ignition during starting up of said engine.

11. A system as set forth in claim 10, wherein said first control circuit provides ignition control means and said second control circuit provides a fuel injection control means for said engine.

12. A system as set forth in claim 10, wherein said internal combustion engine further comprises an ignition coil; and wherein said first control circuit controls the start of current flow through said ignition coil and said second control circuit controls the blocking of current in said ignition coil.

13. In an internal combustion engine having a shaft, a disk rotaring with said shaft and having at least one signal producing segment extending in a predetermined direction, said segment having a first and second edge extending in a direction transverse to said predetermined direction, a sensor for furnishing a pickup signal when said segment passes in operative vicinity thereto, said pickup signal having a leading edge and a trailing edge generated when said first and second edges of said segment pass by said pickup means, respectively, said internal combustion engine further having circuit means (14,15) for furnishing first and second trigger signals respectively in response to said leading and trailing edge of said pickup signal: the improvement comprising a slanted portion (50) on at least one of said edges of said segment; and means for adjusting the position of said pickup means relative to said disk in a direction transverse to the direction tangent to a circle concentric with said disk, for permitting adjustment of the ratio of the interval between said first and second trigger signals to the interval between said second and first trigger signals.

14. In an internal combustion engine having a rotating shaft, a rotary disk having at least one signal-producing segment, a sensor for generating a pickup signal corresponding to said segment having a leading and a trailing edge and extending over a predetermined angle of rotation of said shaft in each cycle of rotation thereof, and first and second control circuits (22, 23) operative in response to first and second control signals, respectively, a method for furnishing said first and second control signals in response to said pickup signal, comprising the steps of furnishing first and second trigger signals respectively in response to said leading and trailing edges of the pickup signal;

computing a basic counting value in the interval from receipt of said second trigger signal to receipt of said first trigger signal, holding said basic counting value during the interval from receipt of said first trigger signal to receipt of said second trigger signal, determining a first and second countdown value by reference to said basic counting value, counting down said first and second countdown values to a predetermined count value following receipt, respectively, of said first and second trigger signals, and timing said first and second control signals for application to said first and second control circuits by the completion of said first and second countdown, respectively.

* * * * *